United States Patent [19]

Katzen et al.

[11] 4,217,178
[45] Aug. 12, 1980

[54] DISTILLATION SYSTEM FOR MOTOR FUEL GRADE ANHYDROUS ALCOHOL

[75] Inventors: Raphael Katzen; George D. Moon, Jr.; Jimmy D. Kumana, all of Cincinnati, Ohio

[73] Assignee: Raphael Katzen Associates International, Inc., Cincinnati, Ohio

[21] Appl. No.: 958,533

[22] Filed: Nov. 7, 1978

[51] Int. Cl.$^2$ .............................................. B01D 3/36
[52] U.S. Cl. ........................................ 203/19; 203/69
[58] Field of Search ............................. 203/19, 18, 69

[56] References Cited

U.S. PATENT DOCUMENTS

| | | | |
|---|---|---|---|
| 1,702,495 | 2/1929 | Clapp | 203/19 |
| 1,822,454 | 9/1931 | Ricard et al. | 203/19 |
| 1,830,469 | 11/1931 | Keyes | 203/19 |
| 1,860,554 | 5/1932 | Ricard et al. | 203/19 |
| 1,982,988 | 12/1934 | Gorhan et al. | 203/19 |
| 2,017,067 | 10/1935 | Kraft | 203/19 |

Primary Examiner—Norman Yudkoff
Attorney, Agent, or Firm—Merriam, Marshall & Bicknell

[57] ABSTRACT

An improved distillation method is provided for obtaining motor fuel grade anhydrous ethanol from fermentation or synthetic feedstocks. A three tower system is used comprising a stripper-rectifier tower in which the dilute feedstock is converted to a concentrated ethanol stream, a dehydrating tower in which water is removed from the concentrated ethanol stream by azeotropic distillation, and a stripper tower for recovering the azeotropic agent. The invention effects substantial energy savings by utilizing the heat content of the overhead vapors from the stripper-rectifier tower to supply the heat required for the dehydrating and stripper towers and by preheating the feedstock in stages utilizing the heat content of the overhead vapors from the dehydrating and stripper towers, the heat content of the overhead vapors from the stripper-rectifier tower and the heat content of the bottoms from the stripper-rectifier tower. Provision is also made for separately removing lower boiling and higher boiling impurities from the stripper-rectifier tower which may be blended into the anhydrous ethanol product from the dehydrating tower.

6 Claims, 2 Drawing Figures

DISTILLATION SYSTEM FOR MOTOR FUEL GRADE ANHYDROUS ALCOHOL

BACKGROUND OF THE INVENTION

This invention relates to an improved distillation system for recovering motor fuel grade anhydrous alcohol from fermentation or synthetic feedstocks.

The use of anhydrous alcohol (99.5 vol.% ethanol) has become an important consideration as a means of saving gasoline produced from high-cost crude oil. It is a well-established fact that up to 20 percent anhydrous ethanol can be blended with gasoline to obtain a relatively high octane antiknock fuel which can be used for internal combustion engines. With some engine modification, anhydrous ethanol can be used as the fuel directly.

Growing requirements for anhydrous ethanol for use in motor fuel gasoline blends require systems that operate with a minimum of energy and that are also reliable in continuous operation. Although production and blending of ethanol with gasoline have been practiced in different countries during the past forty years, the use of ethanol in such blends has been limited because of the relatively high costs of production.

The conventional distillation system for recovering motor fuel grade anhydrous ethanol from a dilute feedstock, such as fermented beer or synthetic crude alcohol, utilizes three towers. In the first tower the feedstock containing, for example, 6 to 10 vol.% ethanol is subjected to a preliminary stripping and rectifying operation in which the concentration of water is materially reduced and concentrated ethanol stream is removed which contains on the order of 95 vol.% ethanol, thereby approaching the ethanol-water azeotrope composition of about 97 vol.% ethanol. The concentrated ethanol stream is next subjected to azeotropic distillation in the second or dehydrating tower using a suitable azeotropic or entraining agent, usually benzene or a benzene-heptane mixture. This results in removal of most of the remaining water, and the desired motor fuel grade anhydrous ethanol product (99.5 vol.%) is recovered from the dehydrating tower. The third tower of the system comprises a stripping tower in which the benzene or other azeotropic agent is recovered from the water-rich phase following condensation and decantation of the azeotropic overhead stream from the dehydrating tower.

One of the key elements in the high operating cost of the above-described conventional distillation system is the high thermal energy requirements of the system, particularly steam consumption. The conventional system also has other serious shortcomings which detract from the commercial feasibility of the use of anhydrous ethanol as motor fuel. For example, the stripper-rectifier tower is occasionally operated under superatmospheric pressure which results in higher temperatures which in turn cause rapid fouling and plugging of the trays. As a consequence, periodic interruption of the operation is necessary to permit cleaning of the tower with resultant high maintenance costs. Futhermore, the conventional system does not include adequate provision to overcome the operating difficulties and product quality problems caused by the presence of higher boiling and lower boiling impurities in the feedstock.

Certain proposals have been made in the prior art to reduce the thermal energy requirements of the system. For example, in 1931-32 the Ricard et al U.S. Pat. Nos. 1,822,454 and 1,860,554 disclosed the use of higher pressures in the first tower than in the other towers and the condensation of the high pressure overhead vapors from the first tower to supply heat to the other towers. However, the energy savings which can be realized by the Ricard et al proposals fall short of the economies required under present day conditions. Moreover, the Ricard et al proposals do not meet the other objections to the conventional system discussed above.

SUMMARY OF THE INVENTION

Accordingly, the principal objects of the present invention are to provide an improved distillation system for recovering motor fuel grade anhydrous ethanol from fermentation or synthetic feedstocks which permits increased energy savings, reduced maintenance and equipment costs, improved operating efficiency, and more reliable quality control of the final product.

In general, we accomplish the foregoing objectives by providing a three stage heat exchange sequence for preheating the feedstock, by utilizing a preferred design and mode of operation for the stripper-rectifier tower, and by separate removal and recovery of higher boiling and lower boiling impurities in the stripper-rectifier tower.

More specifically, in our improved system the feedstock is preheated by heat exchange in separate stages with (1) the overhead streams from the dehydrating and azeotropic agent stripping towers, (2) a portion of the overhead stream from the stripper-rectifier tower, and (3) the bottoms stream from the stripper-rectifier tower. Other portions of the overhead from the stripper-rectifier are condensed in reboilers to provide the heat required for operating the dehydrating and stripping towers. As a result, the steam consumption in our improved system is reduced to the order of 15 to 20 pounds per U.S. gallon of anhydrous ethanol product, dependent upon the ethanol content of the feedstock, which represents an energy saving of from about 38% to about 53% over the conventional system and also represents a substantial additional energy saving over the system described in the aforementioned Ricard et al U.S. Pat. Nos. 1,822,454 and 1,860,554.

From an equipment viewpoint, the preferred form of the invention utilizes a common condenser and cooler for the overhead streams from the dehydrating and stripping towers, thereby lowering the investment and fixed charges of the plant. Also, in the stripper section of the stripper-rectifier tower we prefer to use the internal tower design and mode of operation described in British Pat. No. 1,301,544 and Canadian Pat. No. 876,620 which are incorporated herein by reference. With the baffle tray construction and critical vapor velocity relationships described therein the accumulation of scale and residue is retarded and the trays are to a large extent self-cleaning so that interruption of operation is held to a minimum.

In the present invention we also provide for separate removal of fusel oil fractions and lower boiling impurities from the intermediate and top portions of the stripper-rectifier tower, respectively. The concentrated alcohol stream or "spirits" draw is removed from the stripper-rectifier tower somewhat below the top thereof and is fed to the dehydrating tower which is thereby maintained in a relatively clean and stable condition without impurities buildup.

DETAILED DESCRIPTION

Figure 1:
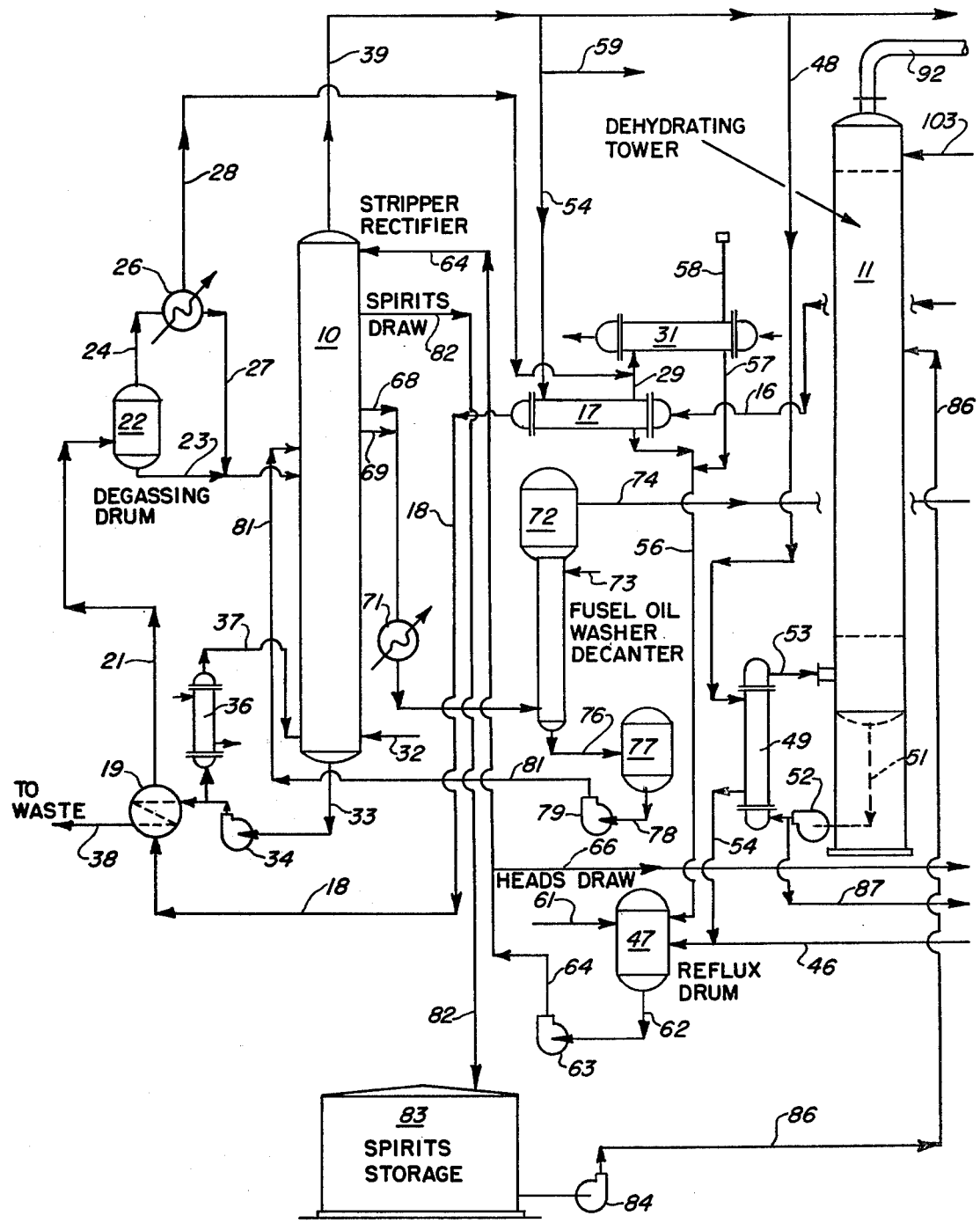
FIG. 1 is a diagrammatic flow sheet showing a portion of a distillation system comprising a preferred embodiment of the present invention.
Figure 2:
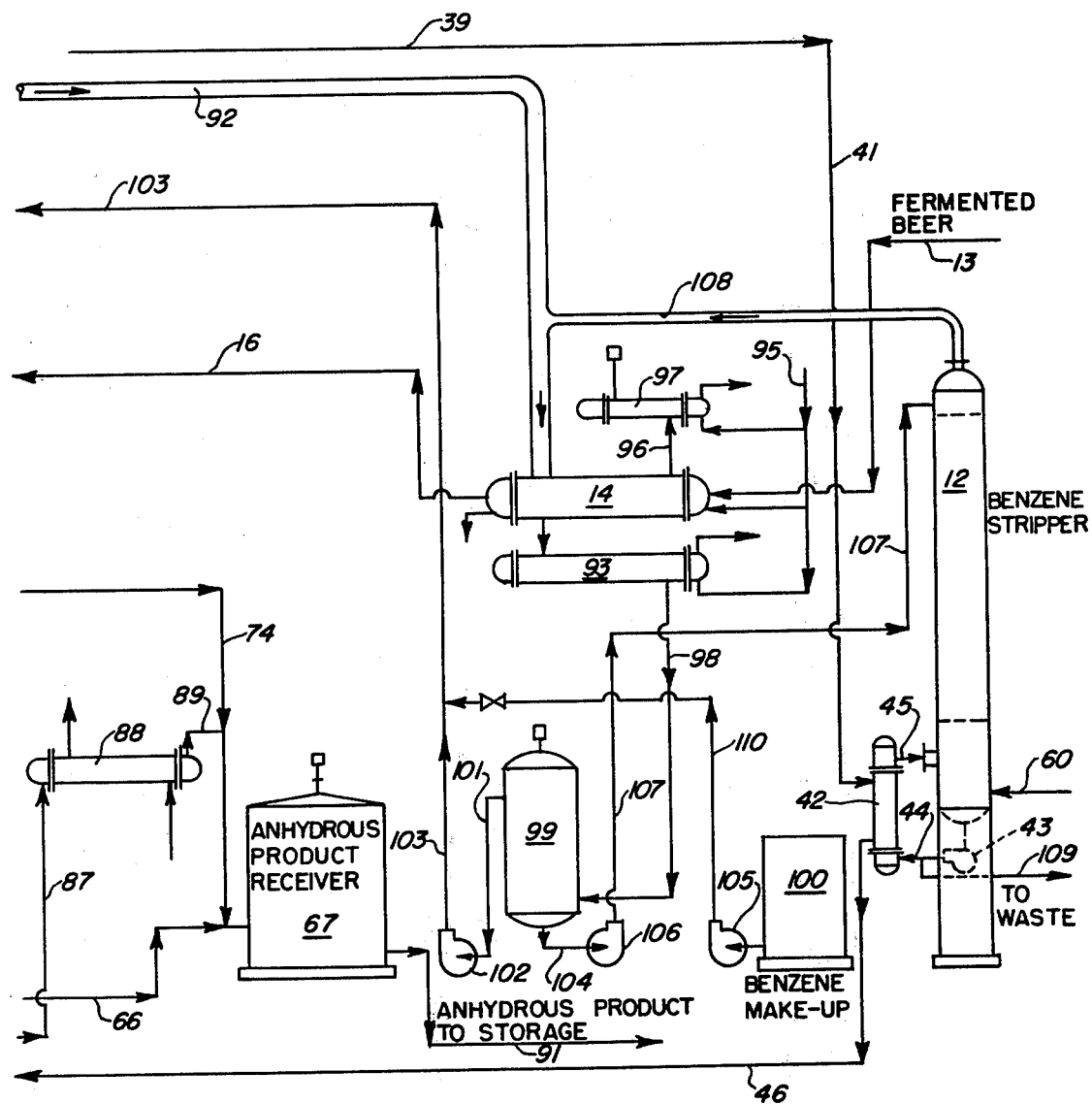
FIG. 2 is a continuation of the flow sheet of FIG. 1 which shows the remainder of the distillation system.

Although any suitable fermented or synthetic feedstock can be used in practicing the invention, the distillation system illustrated in FIGS. 1 and 2 utilizes a fermented beer feedstock obtained by fermentation of a fermentable sugar material. The system utilizes a stripper-rectifier tower 10 (also known as the beer still-rectifier), a dehydrating or azeotropic distillation tower 11, and a benzene stripper tower 12.

The fermented beer at a temperature of about 80° to 100° F. is introduced through line 13 and is preheated in successive stages by passing through condenser 14, line 16, condenser 17, line 18, and heat exchanger 19, as described in more detail below. The preheated feed then passes through line 21 to a degassing drum 22 where dissolved carbon dioxide resulting as a by-product of the fermentation is removed. In the case of synthetic feedstock from direct hydration synthesis, dissolved ethylene would be removed in drum 22. The feed then passes to the midsection of the stripper-rectifier tower 10 through line 23 which is at the top of the stripping section of the tower. The dissolved gas removed from the feed in drum 22 passes through line 24 to a cooler 26, and any condensate is returned through line 27 to line 23. The uncondensed gases pass from cooler 26 through lines 28 and 29 to a vent condenser 31.

Although the stripper-rectifier tower 10 is shown as a single tall tower, it will be understood that the tower may be divided into two shorter stripping and rectifying towers if desired, e.g., where building height or access steel is limiting or for wind or earthquake reasons. In such case, the overhead vapors from the stripping tower would be fed directly into the bottom of the rectifying tower, and the liquid bottoms from the rectifying tower would be pumped to the top of the stripping tower.

Heat for the tower 10 is ordinarily supplied by direct steam introduced through line 32. In the event that further evaporation of the bottoms is desired, heat may be supplied to the tower 10 by recycling a tower bottoms stream through line 33, pump 34, steam heated reboiler 36, and line 37. The balance of the bottoms stream passes through heat exchanger 19 where it is cooled to approximately its atmospheric boiling point before passing through line 38 to waste or stillage concentration.

To conserve thermal energy the invention relies on the overhead vapors from the stripper-rectifier tower 10 as the heating source for the dehydrating and benzene stripper towers 11 and 12. Thus, it is necessary that the tower 10 be operated at a higher pressure (e.g. atmospheric pressure to 100 psig) than the towers 11 and 12 (e.g. sub-atmospheric pressure to 50 psig). In the preferred embodiment of the invention the tower 10 is operated at about 50 psig while the towers 11 and 12 are operated at substantially atmospheric pressure.

Overhead vapors under pressure are removed from tower 10 through line 39 and the stream is divided into three portions. A first portion passes through line 41 and is condensed in reboiler 42 to supply heat to the tower 12 through a recirculating bottoms stream passing from the base of the tower 12 through pump 43, line 44, reboiler 42, and line 45. The condensate passes from the reboiler 42 through line 46 to a reflux drum 47. A second portion of the overhead vapors from tower 10 passes through line 48 and is condensed in reboiler 49 to supply heat to the tower 11 through a recirculating bottoms stream passing through line 51, pump 52, reboiler 49, and line 53. The condensate from reboiler 49 passes through line 54 to line 46 and is also returned to the reflux drum 47. The heat content of the overhead vapors from the stripper-rectifier tower 10 is more than sufficient to supply the heat requirements of towers 11 and 12, and in accordance with the present invention at least part of this surplus energy is utilized by passing a third portion of the overhead vapors from tower 10 through line 54 to heat exchanger 17. The resultant condensate passes through line 56 to the reflux drum 47. Uncondensed vapors from heat exchanger 17 pass through line 29 to the vent condenser 31 where any further condensate is returned through line 57 to line 56 and uncondensible gases are discharged to the atmosphere through vent means 58.

If all the surplus energy in the stripper-rectifier overhead vapors is not recovered in the reboilers 42 and 49 and the condenser 17, further energy savings may be realized by diverting a portion of the overhead vapors from line 54 through line 59 to a plant heat exchanger (not shown) such as a waste heat boiler or a boiler feed water preheater and returning the resultant condensate through line 61 to the reflux drum 47. Also, under certain circumstances it may be desirable to use direct steam through line 60 for heating the tower 12 instead of reboiler 42.

The combined condensates in reflux drum 47 are withdrawn as a reflux stream through line 62 and returned as reflux by a pump 63 through line 64 to the top tray of tower 10. The upper portion (about 10 trays) of tower 10 is operated essentially under total reflux and this upper portion of the tower 10 is referred to as a pasteurizing zone. However, in accordance with the present invention a very small "heads" draw is removed through line 66, which is on the order of 1 to 2% of the total anhydrous ethanol production. Since the overhead from the tower 10 contains the low-boiling impurities in the feedstock, such as acetaldehyde, the continuous "heads" draw through line 66 removes these impurities from the system and avoids the adverse effects such impurities would have if introduced into the dehydrating tower 11. However, the stream in line 66 has significant fuel value and may be passed to the product receiver 67 where it is blended with the anhydrous ethanol product without any detrimental effect on the latter.

Higher boiling impurities such as alcohols and esters (fusel oils) are formed as extraneous products of the fermentation (or synthesis) process, and in the present invention these impurities are removed as liquid side streams 68 and 69 from an intermediate portion of the stripper-rectifier tower 10. The fusel oil draws are normally made at an alcohol concentration between about 100° and about 160° proof. The side streams are passed through a water-cooled exchanger 71 and are then introduced to the lower end of a fusel oil washer-decanter 72. The cooled mixed side stream is washed countercurrently with cold water introduced at 73, and the fusel oils are decanted as an upper layer which is withdrawn through line 74. The separated fusel oil layer also has significant fuel value and is preferably passed to the product receiver 67 where it is also blended into the anhydrous ethanol product. The lower aqueous layer containing ethanol washed out of the fusel oil passes through line 76 to an accumulator drum 77 and is withdrawn through line 78 and pumped by a pump 79 through line 81 to a side entry point somewhat above the main feed entry point (at line 23) of the stripper-rectifier tower 10 but somewhat below the side stream withdrawal point (at lines 68, 69).

An intermediate "spirits" product (95 vol.% ethanol) is removed as a liquid side-draw stream somewhat below the top of the stripper-rectifier tower, e.g. about 10 trays below the top of tower 10. This spirits draw is passed through line 82 to a spirits storage tank 83. The spirits draw stream becomes the feed stream for the dehydrating tower 11, but the intermediate storage tank 83 acts as an accumulator or flywheel in the process. Thus, if a system upset occurs in the dehydrating tower 11, the stripper-rectifier tower 10 can continue in operation in the normal manner, and the ethanol product is accumulated in storage tank 83 until the tower 11 has been restored to acceptable condition.

The spirits product (190° proof) is fed from the storage tank 83 by a pump 84 through line 86 to the central section of the dehydrating tower 11. This tower is an azeotropic tower producing anhydrous motor fuel grade ethanol as its bottom product and utilizing, in this instance, benzene as the azeotropic agent. The bottom product is pumped by pump 52 through line 87 and a water-cooled product cooler 88 where the material is cooled to about 100° F. It then passes through lines 89 and 74 to the product receiver 67. From receiver 67 the anhydrous product is pumped to storage through line 91.

The overhead product from the dehydrating tower 11, which is close in composition to the minimum boiling ternary azeotrope of ethanol, water, and benzene, passes through a line 92 to a condenser-cooler system consisting of heat exchanger 14 and water-cooled cooler 93. The azeotropic vapors are condensed in condenser 14 by heat exchange with feedstock introduced through line 13 and removed through line 16. The condensate is cooled in cooler 93, and vapors from the condenser 14 pass through line 96 to a vent condenser 97. Cooling water from a line 95 is supplied to heat exchanger 14, cooler 93, and condenser 97.

The condensed and cooled product flows through line 98 to decanter 99. The upper layer from the decanter 99 is a benzene-rich stream which is withdrawn through line 101 and pumped by pump 102 through line 103 as reflux to the top tray of dehydrating tower 11. When required, makeup benzene from tank 100 may be added to the system through pump 105 and line 110. The decanter bottom layer, a water-rich layer containing some ethanol and benzene, is withdrawn through line 104 and pumped by pump 106 through line 107 to the top tray of benzene stripper tower 12. Overhead vapors from the benzene stripper tower 12 pass through line 108 which joins line 92, and the combined vapors from towers 11 and 12 pass to the common condenser-cooler system 14-93. The bottoms product from the benzene stripper 12 is a water stream, essentially free of benzene and ethanol, which is discarded through line 109.

From the foregoing it will be seen that the invention accomplishes very substantial reductions in energy consumption by recovering and utilizing to the fullest extent the heat content of the overhead vapors from the three towers of the system. Thus, the overhead vapors from the stripper-rectifier tower supply all of the heat requirements for the dehydrating tower and the benzene stripper tower, but there is still surplus thermal energy which is utilized, at least in part, to preheat the feedstock to the process. The feedstock is preheated in three stages. First, the feedstock is preheated in the condenser 14 for the combined overhead vapors from the dehydrating and benzene stripper towers, this initial step providing about 20% of the required preheating. Next, additional feed preheat constituting about 25% of the total required is added in the condenser 17 which utilizes the excess overhead vapors from the stripper-rectifier tower 10, i.e. over and above the amount required for the reboilers 49 and 42 of the dehydrating and benzene stripper towers. The balance of the preheat addition required to bring the dilute feedstock to its saturation temperature is supplied in heat exchanger 19 by the hot bottoms from the stripper rectifier tower 10. Any additional surplus heat in the stripper-rectifier overhead which is not utilized in the reboilers 42 and 49 and in condenser 17 may be recovered in auxiliary portions of the plant such as in a boiler feed water preheater or a waste heat boiler. The net result of the economies effected by the present invention is that the steam consumption (usually only for heating the tower 10) is reduced to the order of 15 to 20 pounds per U.S. gallon of anhydrous ethanol product, dependent upon the alcohol content of the feedstock.

Preheating the feedstock, in part, by condensation in the condenser 17 of a portion of the overhead vapors from the stripper-rectifier tower 10 also has the advantage of improving the controllability of the tower 10. Thus, the heat exchange in condenser 17 acts as a "trim condenser" and eliminates the need for a water-cooled condenser.

Since the tower 10 is ordinarily operated under superatmospheric pressure, we prefer to use the simple baffle tray design and mode of operation described in British Pat. No. 1,301,544 and Canadian Pat. No. 876,620 in order to minimize scaling and fouling of the tower. In the aforesaid patents the section of the tower below the feed tray is provided with a plurality of vertically spaced baffles in the form of smooth surfaced plate members which are imperforate, except for specified relatively large open areas for the passage of fluids, and are free of the usual flow-obstructing protuberances such as weirs, seals, bubble caps, downcomers, and the like. The vapor-liquid contacting action is obtained in the vertical spaces between successive baffles.

Although other baffle designs may be used, the preferred structure comprises a "disk and donut" baffle configuration consisting of a plurality of vertically-spaced annular or ring-shaped baffle members and a plurality of circular or disk-shaped baffle members interposed in vertically spaced relation between the annular baffle members. The outer peripheries of the annular baffle members engage the inner surface of the tower and the inner peripheries or edges of these baffle members define circular open areas. The circular baffle members overlie and are in substantial axial alignment with the open areas in the adjacent annular baffle members. An annular open area is defined between the edge of each circular baffle member and the wall of the tower, and the open areas of adjacent baffle members are transversely offset so that the ascending gas or vapor phase must traverse a tortuous path with repeated changes of direction in passing upwardly through the open areas of the baffles.

The vertical space between successive baffles is such that the liquid phase which overflows the edges of the open areas of the baffles is contacted with a relatively high velocity gas or vapor phase so as to effect substantially complete dispersion of the down-flowing curtain of liquid into discrete droplets or an aerated liquid or froth, depending upon the surface tension relationship of the gas or vapor and the liquid. Thereafter, as the gas or vapor containing the entrained liquid droplets passes upwardly through the open areas of the baffles, the velocity is substantially decreased so that the major part of the liquid droplets will coalesce and drop back to the next lower baffle thereby keeping the net entrainment to a minimum. The separated gas or vapor, containing only a moderate amount of entrained liquid, then passes upwardly through the next vertical space between baffles and the dispersing or frothing effect is repeated. By means of the repeated velocity changes between successive sets of baffles, a multiplicity of contacts are effected whereby selected components of the gas or vapor will be transferred into the descending liquid or selected components of the liquid phase will be desorbed or stripped and transferred into the ascending gas or vapor stream.

In the preferred mode of operation of the baffle tray tower the flow rate of the gas or vapor phase is correlated with the vertical spacing between adjacent baffles and with the open areas of the baffles such that the horizontal velocity factor $f_h$ between adjacent baffles is within the range of from 0.20 to 0.80 feet per second and the vertical velocity factor $f_v$ in the open areas of the baffles is substantially less than the horizontal velocity factor $f_h$ and is also within the range of from 0.10 to 0.40 feet per second. The velocity factors are determined in accordance with the following equations:

$$f_h = U_h \left( \frac{\rho v}{\rho l - \rho v} \right)^{\frac{1}{2}}$$

$$f_v = U_v \left( \frac{\rho v}{\rho l - \rho v} \right)^{\frac{1}{2}}$$

where $U_v$ is the velocity in feet per second of the gas or vapor phase passing through the open areas of the baffles, $U_h$ is the velocity in feet per second of the gas or vapor phase passing through the descending liquid phase between adjacent baffles, $\rho_v$ is the density in pounds per cubic foot of the ascending gas or vapor phase at the temperature and pressure in the tower, and $\rho_l$ is the density in pounds per cubic foot of the descending liquid phase at the temperature in the tower. In general, the horizontal velocity factor will be on the order of twice the vertical velocity factor, and because of the intensive agitation caused by contact of rising vapors against descending liquid, the baffle trays are to a large extent self-cleaning so that interruption of operations is at a minimum.

The present invention also affords further energy savings and improved reliability of operation and quality control of the final product as a result of the provision made for separate removal of higher boiling and lower boiling impurities in the stripper-rectifier tower. If fusel oil is allowed to accumulate in the midsection of the tower 10, the operation of the tower becomes unstable resulting in excessive loss of alcohol from the bottom of the tower and considerable variation in alcohol proof and concentration in the spirits draw from the tower. On the other hand, if lower boiling impurities, such as acetaldehyde, are also included in the concentrated alcohol product fed to the dehydrating tower 11, both types of impurities will have an adverse effect on the normal composition of the azeotropic mixture leaving the top of the tower. This, in turn, results in incomplete separation of the aqueous and benzene layers in the decanter 99 and also an inefficient operation because of changes in composition of the azeotrope which usually requires an additional thermal energy input. By the present invention, however, the alcohol spirits stream fed to the dehydrating tower is maintained in a relatively clean and stable condition without impurities buildup. Not only is the distillation operation stabilized in towers 10 and 11 to yield consistent quality of product with minimal losses, but also maximum use may be made of the separated fusel oil and lower boiling impurities by blending them into the primary anhydrous ethanol product.

For purposes of further illustrating the invention, the following non-limiting specific example is provided.

EXAMPLE

A distillation system as shown in FIGS. 1 and 2 and described above is used to recover 199° U.S. proof motor fuel grade ethanol from a fermented feedstock at a production rate of 1321 gallons per hour when operating at an 86.4% utilization factor (7570 hours per year).

The fermented beer feedstock having an ethanol content of 8.54 wt. % is preheated in three stages to heat it to the saturated liquid condition. In the first stage the feedstock is heated from about 90° F. to about 132° F. in the condenser 14; in the second stage, the feedstock is heated to about 175° F. in the condenser 17; and in the third stage, the feedstock is heated to its saturation temperature of about 281° F. in the heat exchanger 19. About 22% of the total preheating required is supplied in the first stage, about 22.5% in the second stage, and the balance in the third stage.

The degassed, hot, dilute beer feed is fed from the drum 22 at a rate of 213.5 gallons per minute to an intermediate tray of the stripper-rectifier tower 10. The stripper-rectifier tower 10 contains sixty trays, is sixty-six inches in diameter, and operates at a head pressure of 50 psig. Overhead vapors having a 95 vol. % ethanol content and a temperature of about 250° F. are removed from tower 10 at a rate of 1279 pound-moles per hour and are divided between condenser 17 and reboilers 49 and 42 in the amounts of 22.5%, 73.8% and 3.7%, respectively. The tower 10 is heated by 150 psig steam supplied to the shell side of reboiler 36, the steam consumption being 17.1 pounds per gallon of motor fuel grade alcohol produced. Bottoms containing 0.02 wt. % ethanol are removed from the tower 10 at a temperature of about 304° F. and a rate of 210 gallons per minute. In heat exchanger 19 the temperature of the bottoms stream is reduced to about 212° F. Valuable animal feed by-products can be obtained by further concentration of the bottoms in a subsequent operation. If recovery of such by-products is not desired, the heat to the tower 10 can be supplied by open steam injection through line 32, in which case the steam consumption is reduced to 16.2 pounds per gallon of motor fuel grade alcohol produced.

One or more side streams are continuously withdrawn from the tower 10 through lines 68 and/or 69, the side streams having an ethanol concentration ranging between 100° proof and 160° proof and amounting to 2 to 5% of the volume of motor fuel grade alcohol produced. In heat exchanger 71, the temperature of the side stream is reduced to about 100° F. Cold Water is supplied to the washer-decanter 73 in an amount sufficient to give a lower alcohol-water layer having a concentration corresponding to 30° proof alcohol.

The heads draw or purge stream through line 66 amounts to about 1 to 2% of the quantity of motor fuel grade alcohol produced. The spirits draw through line 82 is made about ten trays from the top of tower 10 at a rate of 23 gallons per minute and contains 95 vol % ethanol.

The azeotropic dehydrating tower 11 operates at atmospheric pressure, contains fifty trays and is seventy-eight inches in diameter. Benzene is employed as the azeotropic solvent in the system. The system ethanol-benzene-water possesses a minimum boiling ternary azeotrope, which, at atmospheric pressure, contains 18.5 wt. % ethanol, 74.1 wt. % benzene, and 7.4 wt. % water. The boiling point of the atmospheric azeotrope is 148.7° F. Tower 11 serves to separate the 190° proof spirits feed into an overhead product having a composition close to that of the minimum boiling ternary azeotrope and a bottoms product which is the motor fuel grade alcohol product containing 99.5 vol. % ethanol (199° proof).

The motor fuel grade ethanol product leaves the base of tower 11 at the rate of 22 gallons per minute at a temperature of 194° F. The product is pumped via pump 52 through water cooled heat exchanger 88 where the product alcohol is cooled to approximately 100° F. before entering anhydrous product receiver 67. The reblending of the fusel oil fraction and heads drawn fraction occurs between product cooler 88 and anhydrous product receiver 67.

Overhead vapors leave tower 11 through line 92 at a temperature of approximately 150° F. and with a composition approaching that of the minimum boiling ternary azeotrope. These vapors are condensed in condenser 14 where they give up part of their heat of condensation to supply a fraction of the dilute beer feed preheat requirement. The balance of the condensation heat is removed in unit 14 by cooling water. The condensed vapor is next subcooled to approximately 90° F. in water-cooled subcooler 93.

The benzene stripper tower 12 is a thirty tray atmospheric pressure tower having a diameter of thirty inches. The stripped water stream at about 228° F. is withdrawn through line 109 at a rate of 1.3 gallons per minute.

Although the invention has been described with particular reference to the preferred embodiment illustrated in the drawings, it will be understood that various modifications may be made without departing from the scope of the invention as defined in the appended claims.

We claim:
1. In a distillation system for recovering anhydrous ethanol from a dilute feedstock wherein the feedstock is introduced into a stripper-rectifier tower, a concentrated ethanol stream is removed from said stripper-rectifier tower and introduced into a dehydrating tower, an azeotropic agent is also introduced into said dehydrating tower, a substantially azeotropic composition is removed overhead from said dehydrating tower, an anhydrous ethanol product is recovered from the bottom portion of said dehydrating tower, the azeotropic overhead from said dehydrating tower is condensed and separated into an upper phase rich in azeotropic agent and a lower water-rich phase, the upper phase is returned to said dehydrating tower, and the lower water-rich phase is introduced into a stripper tower wherein the azeotropic agent is recovered and returned to the system;

the improvement which comprises the steps of:
(a) maintaining a higher pressure in said stripper-rectifier tower than in said dehydrating tower and said stripper tower;
(b) removing overhead vapors, including lower boiling impurities, from said stripper-rectifier tower;
(c) condensing first and second portions of said overhead vapors from said stripper-rectifier tower to supply the heat required in said dehydrating tower and said stripper tower;
(d) condensing at least a third portion of said overhead vapors from said stripper-rectifier tower;
(e) combining the condensates from steps (c) and (d) and returning the combined condensates as reflux to the top portion of said stripper-rectifier tower, except for the removal of a small heads draw containing said lower boiling impurities;
(f) removing from an intermediate portion of said stripper-rectifier tower at least one fusel oil side draw containing higher boiling impurities;
(g) washing said fusel oil side draw with water, and separating a fusel oil layer from an aqueous ethanol-containing layer;
(h) returning said aqueous ethanol-containing layer as feed to said stripper-rectifier tower; and
(i) preheating said feedstock in stages, prior to introducing the same into said stripper-rectifier tower, by means of heat obtained (1) by condensing said azeotropic overhead from said dehydrating tower and overhead vapors from said stripper tower, (2) by condensing said third portion of said overhead vapors from said stripper-rectifier tower, and (3) by heat exchange with bottoms from said stripper-rectifier tower.

2. The system of claim 1 further characterized in that said stripper-rectifier tower is operated at superatmospheric pressure and contains in the stripper section a plurality of vertically spaced baffles comprising substantially smooth surfaced imperforate plate members which are free of weirs, seals, bubble caps, downcomers and the like, said baffles being arranged to provide transversely offset open areas so that ascending gas or vapor phase traverses a tortuous path upwardly through the tower as liquid phase descends therethrough; and
the flow rate of said gas or vapor phase is correlated with the vertical spacing between adjacent baffles and with the open areas of said baffles such that the horizontal velocity factor $f_h$ between adjacent baffles is within the range of from 0.20 to 0.80 feet per second and the vertical velocity factor $f_v$ in the open areas of said baffles is substantially less than the horizontal velocity factor $f_h$ and is within the range of from 0.10 to 0.40 feet per second, said velocity factors being determined in accordance with the following equations:

$$f_h = U_h \left( \frac{\rho v}{\rho l - \rho v} \right)^{\frac{1}{2}}$$

$$f_v = U_v \left( \frac{\rho v}{\rho l - \rho v} \right)^{\frac{1}{2}}$$

where $U_v$ is the velocity in feet per second of the gas or vapor phase passing through the open areas of said baffles, $U_h$ is the velocity in feet per second of the gas or vapor phase passing through the descending liquid phase between adjacent baffles, $\rho_v$ is the density in pounds per cubic foot of the ascending gas or vapor phase at the temperature and pressure in the tower, and $\rho_l$ is the density in pounds per cubic foot of the descending liquid phase at the temperature in the tower; whereby the liquid phase overflows the baffle edges as a continuous curtain and is dispersed into discrete droplets or froth by high velocity gas or vapor phase in the vertical spaces between adjacent baffles and a decreased gas or vapor phase velocity is obtained in the open areas of the baffles permitting the major part of the liquid droplets or froth to coalesce and separate from the ascending gas or vapor phase.

3. The system of claim 1 wherein the pressure in said stripper-rectifier tower is from atmospheric pressure to about 100 psig and the pressure in said dehydrating tower and said stripper tower is from sub-atmospheric to about 50 psig.

4. The system of claim 1 wherein said concentrated ethanol stream is removed from said stripper-rectifier tower at a location below the point of return of said reflux but above the point of removal of said fusel oil side draw.

5. The system of claims 1, 3 or 4 wherein said azeotropic overhead from said dehydrating tower and said overhead vapors from said stripper tower are condensed in a common condenser.

6. In an apparatus for recovering anhydrous ethanol from a dilute feedstock including a stripper-rectifier tower, a dehydrating tower, a stripper tower, means for introducing the feedstock to the midsection of said stripper-rectifier tower, means for withdrawing a concentrated ethanol stream from the upper portion of said stripper-rectifier tower and introducing the same into said dehydrating tower, means for introducing an azeotropic agent into said dehydrating tower, means for removing an azeotropic overhead from said dehydrating tower, means for removing an anhydrous ethanol product from the bottom portion of said dehydrating tower, condenser means for condensing said azeotropic overhead and separating the resultant condensate into an upper phase rich in said azeotropic agent and a lower water-rich phase, means for returning said upper phase to said dehydrating tower, means for introducing said lower phase into said stripper tower, and means for recovering said azeotropic agent from said stripper tower and returning the same to said dehydrating tower;

the improvement which comprises:
(a) means for removing overhead vapors, including lower boiling impurities, from said stripper-rectifier tower;
(b) first reboiler means for condensing a first portion of said overhead vapors from said stripper-rectifier tower to supply the heat required in said dehydrating tower;
(c) second reboiler means for condensing a second portion of said overhead vapors from said stripper-rectifier tower to supply the heat required in said stripper tower;
(d) heat exchanger means for condensing a third portion of said overhead vapors from said stripper-rectifier tower;
(e) means for combining the condensates from said first and second reboiler means and said heat exchanger means and returning the combined condensates as reflux to the top portion of said stripper-rectifier tower;
(f) means for removing a portion of said combined condensates as a heads draw containing said lower-boiling impurities;
(g) means for removing from an intermediate portion of said stripper-rectifier tower at least one fusel oil side draw containing higher boiling impurities;
(h) washer means for washing said side draw with water and separating a fusel oil layer from an aqueous ethanol-containing layer;
(i) means for returning said aqueous ethanol-containing layer as feed to said stripper-rectifier tower;
(j) means for introducing overhead vapors from said stripper tower into said condenser means for effecting combined condensation of said azeotropic overhead from said dehydrating tower and said overhead vapors from said stripper tower;
(k) means for passing said feedstock, prior to introduction to said stripper-rectifier tower, in heat exchange relation through said condenser means as a first feedstock preheating step;
(l) means for passing said feedstock from said condenser means in heat exchange relation through said heat exchanger means as a second feedstock preheating step;
(m) means for withdrawing a bottoms stream from said stripper-rectifier tower; and
(n) means for passing said feedstock from said heat exchanger means in heat exchange relation with said bottoms stream as a third feedstock preheating step.

* * * * *